United States Patent
Brueggemann et al.

[11] Patent Number: 6,148,788
[45] Date of Patent: Nov. 21, 2000

[54] VALVE FOR LIQUIDS

[75] Inventors: Hans Brueggemann, Winterbach; Arthur Klotz, Remseck; Rudolf Leipelt, Marbach, all of Germany

[73] Assignee: Filterwerk Mann & Hummel GmbH, Ludwigsburg, Germany

[21] Appl. No.: 09/171,777

[22] PCT Filed: Mar. 21, 1997

[86] PCT No.: PCT/EP97/01444

§ 371 Date: Apr. 29, 1999

§ 102(e) Date: Apr. 29, 1999

[87] PCT Pub. No.: WO97/41373

PCT Pub. Date: Nov. 6, 1997

[30] Foreign Application Priority Data

Apr. 26, 1996 [DE] Germany ................. 1964 16 646

[51] Int. Cl.[7] ...................................... F01M 1/18
[52] U.S. Cl. ........................... 123/196 S; 137/624.27; 137/463
[58] Field of Search .............. 137/463, 624.27; 123/196 S, 196 R; 184/6.3, 6.4, 6.23

[56] References Cited

U.S. PATENT DOCUMENTS

| | | | |
|---|---|---|---|
| 3,220,695 | 11/1965 | Downey et al. | 251/263 |
| 3,802,459 | 4/1974 | Geraudie | 137/384.6 |
| 4,067,358 | 1/1978 | Streich | 137/624.13 |
| 4,464,946 | 8/1984 | Kraus | 476/8 |
| 4,625,762 | 12/1986 | Hassanzadeh et al. | 137/624.27 |
| 4,960,218 | 10/1990 | Toida et al. | 215/311 |
| 5,456,448 | 10/1995 | Chou | 251/230 |
| 5,599,003 | 2/1997 | Seemann et al. | 251/30.03 |
| 5,894,825 | 4/1999 | Duerr | 123/196 S |
| 6,047,731 | 4/2000 | Conrads et al. | 137/624.27 |

*Primary Examiner*—Andrew M. Dolinar
*Assistant Examiner*—Hai Huynh
*Attorney, Agent, or Firm*—Evenson, McKeown, Edwards & Lenahan, P.L.L.C.

[57] ABSTRACT

A valve for liquids including a valve housing (10) and a valve body (13) which is guided in the housing, and at least one releasable catch (16) which engages the valve body and holds the valve body in an open position in the valve housing until liquid starts to pass through the valve.

8 Claims, 9 Drawing Sheets

VALVE FOR LIQUIDS

BACKGROUND OF THE INVENTION

The invention relates to a valve for liquids, comprising a valve housing and a valve body which is guided in the housing.

Such a valve is known from DE-OS 36 13 093. This valve is disposed in an oil filter and serves as an outlet check valve for the clean liquid. Furthermore, an additional return check valve is provided therein for unfiltered liquid.

When an oil circuit is started up, especially in an internal combustion engine, initially there is no oil in the oil lines and in the oil containing and oil supply parts, i.e., even the oil pump is not yet filled with oil. If the oil pump is then started, it must first drive the air out of the lines against the resistance of this return check valve. This can take a fairly long time during which the internal combustion engine has no supply of oil. To avoid this disadvantage it might be desirable to fill the oil lines with oil ahead of time. This, however, takes a great amount of time.

SUMMARY OF THE INVENTION

The invention is addressed to the problem of avoiding the aforementioned disadvantages and assuring that the oil circulation starts as quickly as possible.

This problem is solved by the features of claim 1 as well as by the features of the dependent claims.

The substantial advantage of the invention is to be seen in the fact that the valve is initially in an open position. Not until the valve is unlocked does it shift to the closed position and thus produces its checking action. As a result of the open position of the valve, it is assured that the air in the system can escape very quickly, without back pressure, and that the liquid can thus flow through afterward.

According to one advantageous embodiment of the invention the pressure of the incoming liquid causes a movement of the valve body away from the locked position, so that this valve body is released and is moved into the normal position.

Another embodiment of the invention envisions that the catch means for the valve body is a projection disposed on the valve housing. A groove or slot in the valve body shaft is engaged by the projection, so that a bayonet-like catch is formed for holding the valve body in the open position. Of course, it is also possible to configure the locking means as a projection on the valve body and a slot on the valve housing.

In another advantageous embodiment, the projections are configured such that the pressure of the liquid produces a rotary movement of the valve body, such that the displacement is converted to a rotary movement by the positive guidance of the projection in a spiral path. Thus the valve body is moved out of the locked position.

An additional embodiment of the invention envisions equipping the valve body with vane-like elements. These elements serve to turn the valve body to or hold the valve body in a position which is removed from the locked position. In this way any later unintentional locking of the valve body is effectively prevented.

The valve is advantageously employed in the oil circuit for supplying oil to an internal combustion engine, and when the motor is started it is initially in the open position. As soon as oil is conveyed by the oil pump, the valve body is released from and stays out of the open position and moves into the normal operating position.

These and other features of preferred embodiments of the invention are found not only in the claims but also in the description and the drawings, it being possible for the individual features to be realized individually or together in the form of subcombinations in the embodiment of the invention and in other fields, and may constitute advantageous as well as independently patentable embodiments for which protection is hereby claimed.

BRIEF DESCRIPTION OF THE DRAWINGS

The invention will be explained hereinafter in further detail with reference to working embodiments.

DETAILED DESCRIPTION OF PREFERRED EMBODIMENTS

Figure 1:
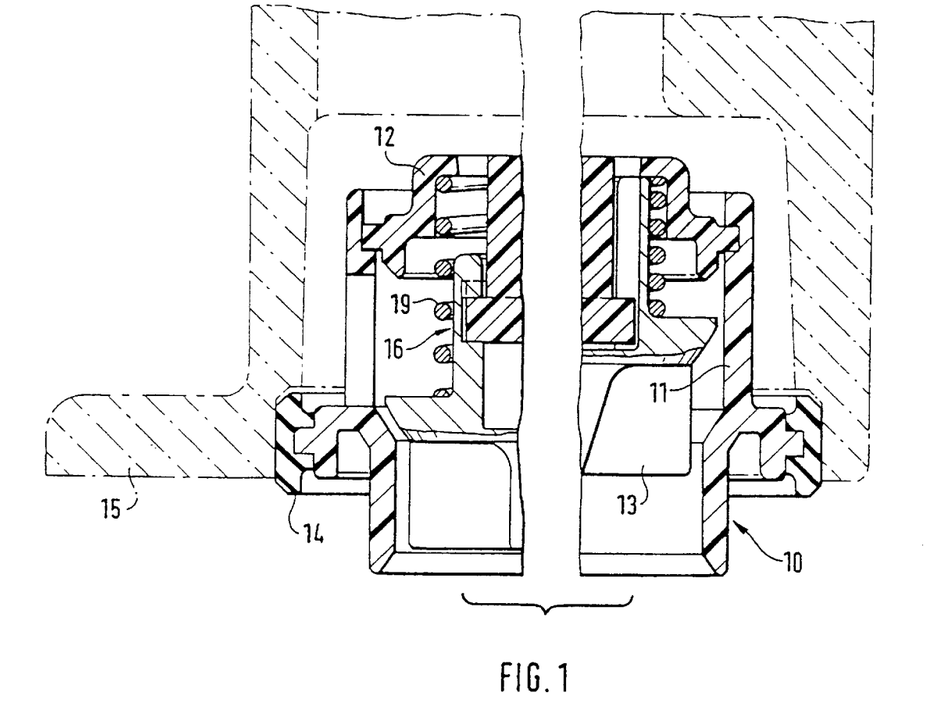
FIG. 1 shows a valve for liquids in a sectional view.
Figure 1A:
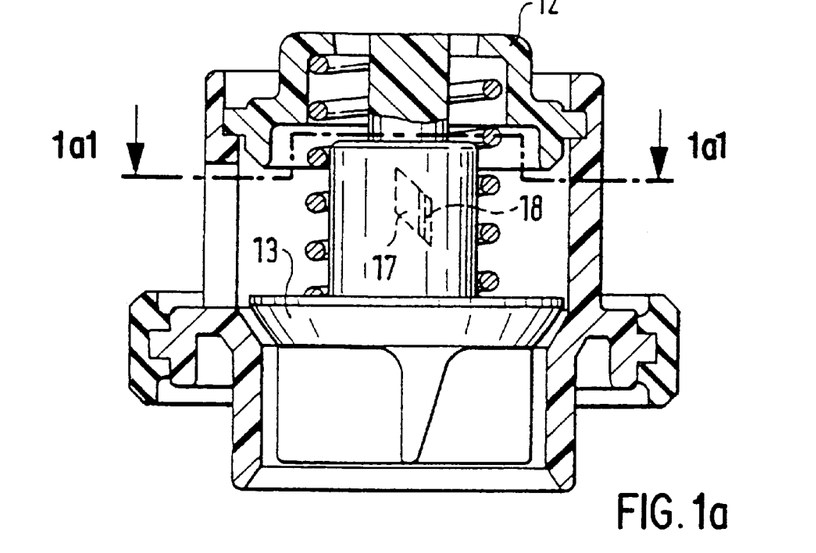
FIG. 1a to FIG. 1e show detail views the valve of FIG. 1 in different operating positions.
Figure 1A:
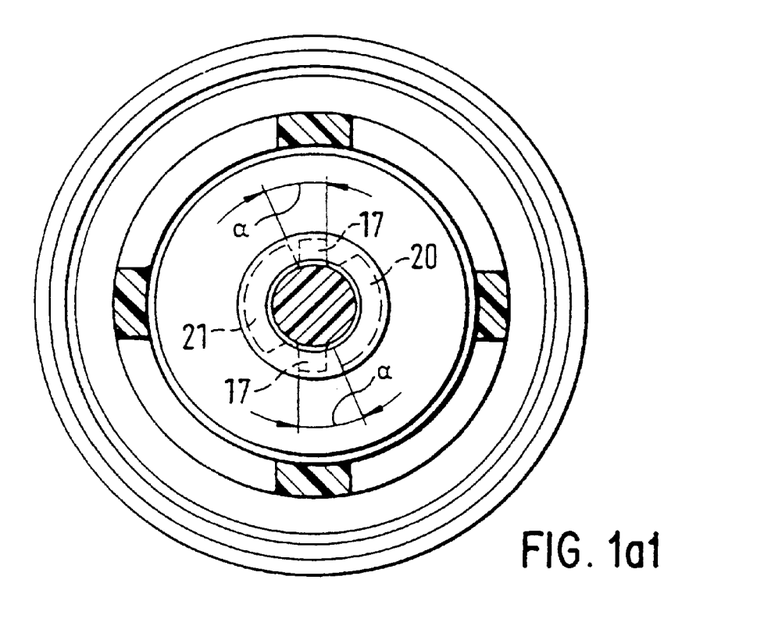

The valve in FIG. 1 comprises a valve housing 10. This valve housing 10 is constructed in one piece or two pieces and includes a housing cylinder 11 as well as a housing upper part 12. Housing cylinder 11 and housing upper part 12 are, for example, injection-molded synthetic resin parts which are snapped or welded to each other. In the valve housing there is a valve body 13. The valve is fastened via a seal 14 to a housing or tube 15 shown here in broken lines. The left half section of FIG. 1 shows the valve body 13 in an open position. This open position is secured by detent connections in the form of catch means 16. The catch means 16 comprises two projections 17 disposed on the housing upper part. These projections 17 engage in grooves 18 of the valve body 13. The right half section shows the valve fully open. Here the valve body 13 is held at the upper stop against the force of spring 19. This position simultaneously produces an unlocking of the valve body, i.e., a release of the catch means 16. This is shown in further detail hereinafter in FIGS. 1a to 1e. Corresponding parts are indicated by the same reference numbers.

Figure 1B:
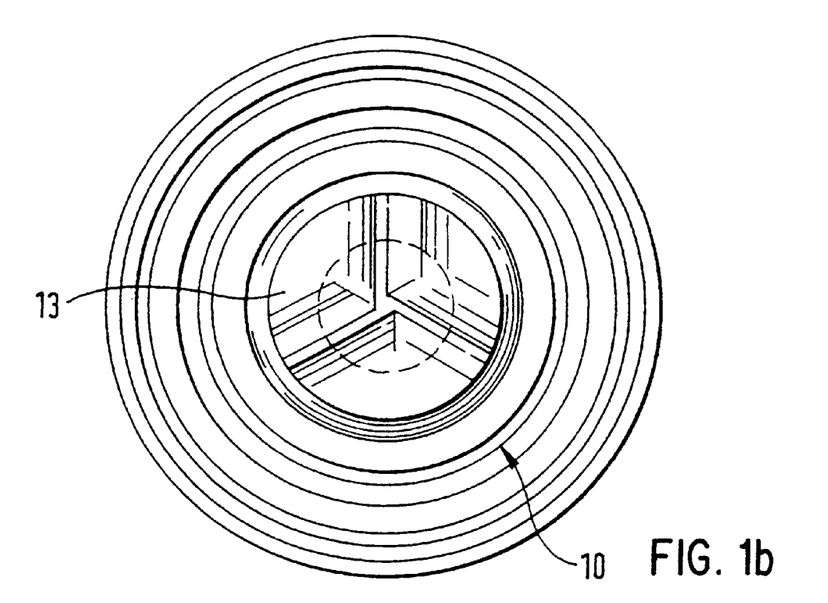
Figure 1B:
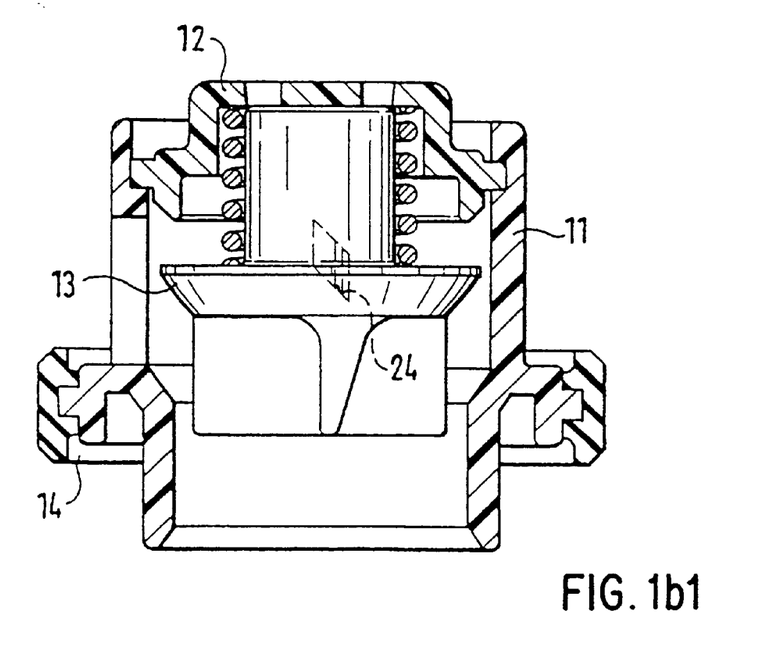
Figure 1C:
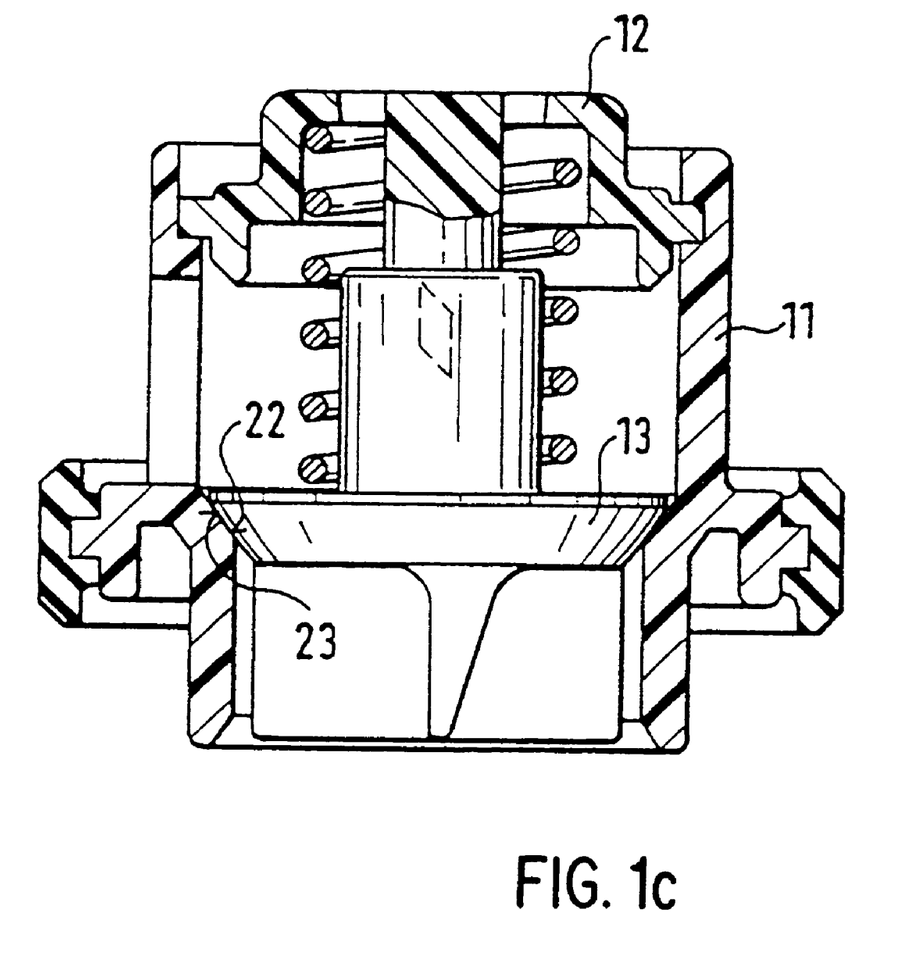

FIG. 1a again shows the open position in accordance with the left half section of FIG. 1. The projection 17 of the upper housing part 12 is disposed in the groove 18 of the valve body 13. In the plan view it can be seen that the groove 18 extends only over the angular area α of the valve body. As soon as the valve body is moved upward, it slides as shown in FIG. 1b along a slide surface 24, so that the valve body rotates within the valve housing. This rotatory movement turns the projection 17b out through the angle α and thus effects a release of the projection in the areas 20 and 21. From these areas the valve body can move all the way to the bottom as shown in FIG. 1c, and produce a valve effect, i.e., it closes the opening between the valve surfaces 22 and 23.

Figure 1D:
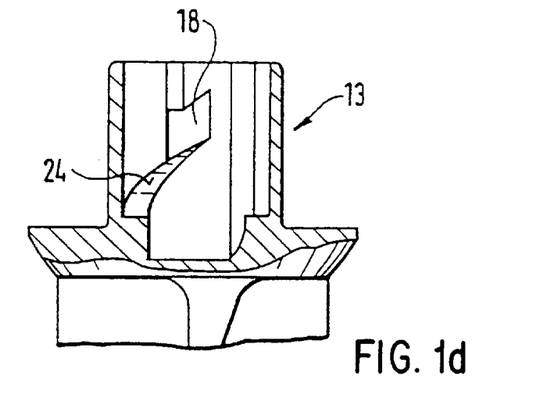
Figure 1D:
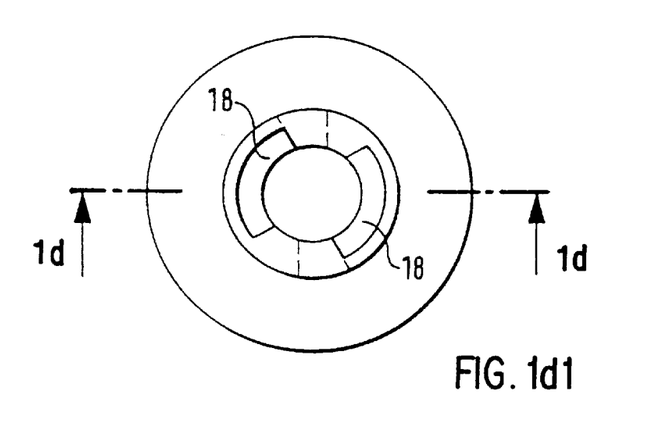

FIG. 1d shows a detail view of the valve body 13. Here both the groove 18 and the slide track 24 can clearly be seen.

Figure 1E:
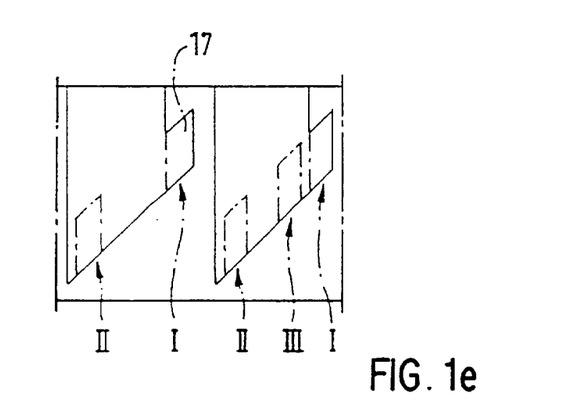

FIG. 1e shows the switching slide angled off with the projection 17 in various positions, initially in the catch position I and then in the open position II. After only 45° the valve body is released. Position III is sufficient to allow the valve body to pass over to its normal manner of operation.

Figure 2:
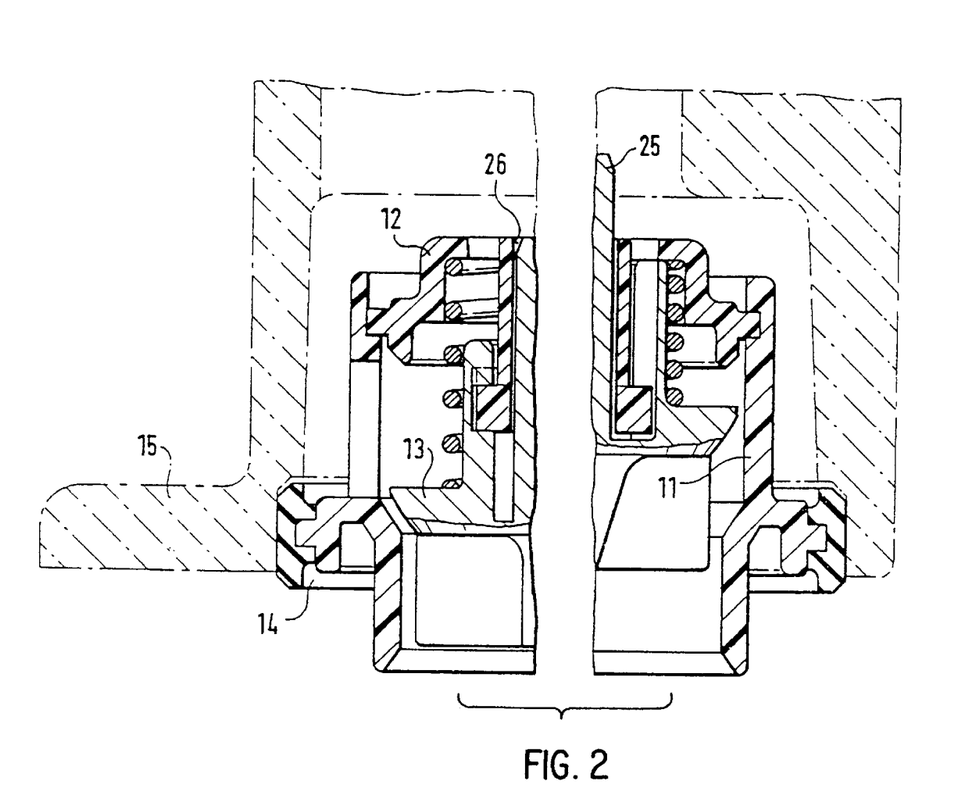
FIG. 2 shows a variant of the valve shown in FIG. 1.

FIG. 2 shows a variant of a valve. Here the valve body 13 is equipped with a guide pin 25 to guard against possible rocking. This guide pin slides in an opening 26 in the upper part 12 of the housing. The operation of the valve of FIG. 2 corresponds in principle to that shown in FIG. 1.

Figure 3:
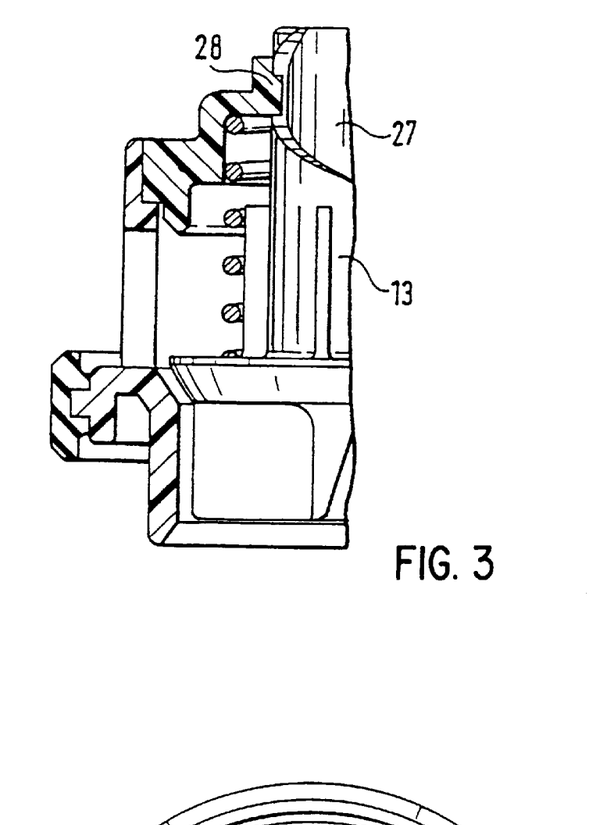
FIG. 3 shows a variant of a valve.

FIG. 3 shows a variant in which the switching slide is disposed externally on the valve shaft 27 of the valve body 13. Here the housing upper part 12 is provided with the corresponding projection 28. This projection 28 engages, according to FIG. 3a, the groove in the switching slide of the valve shaft 27.

Figure 3A:
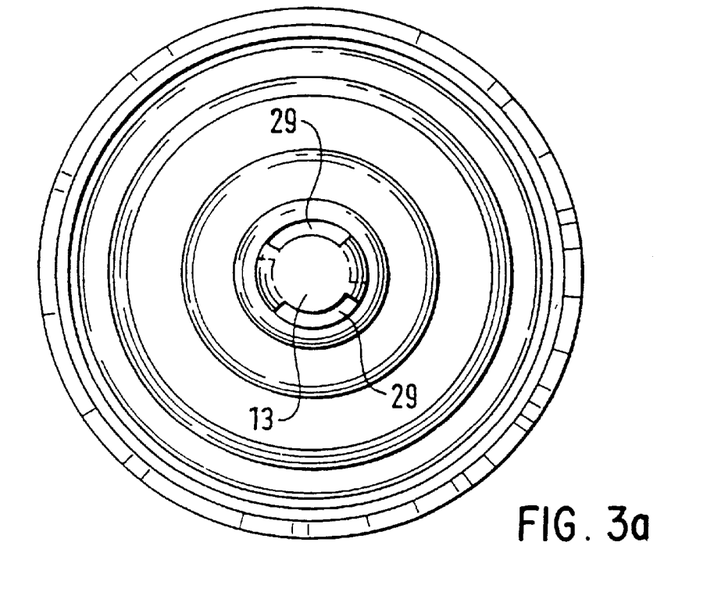
FIGS. 3a and 3b show detail views of the valve shown in FIG. 3.
Figure 3A:
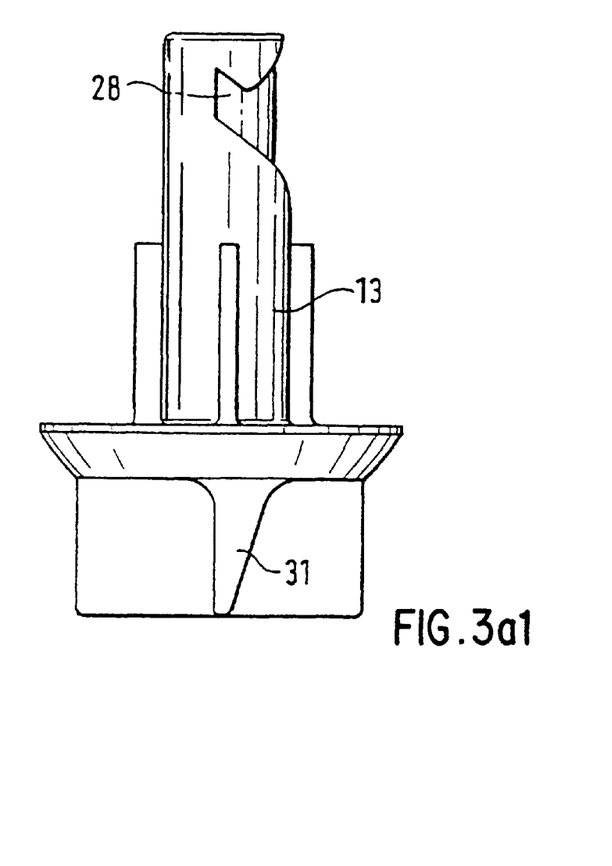
Figure 3B:
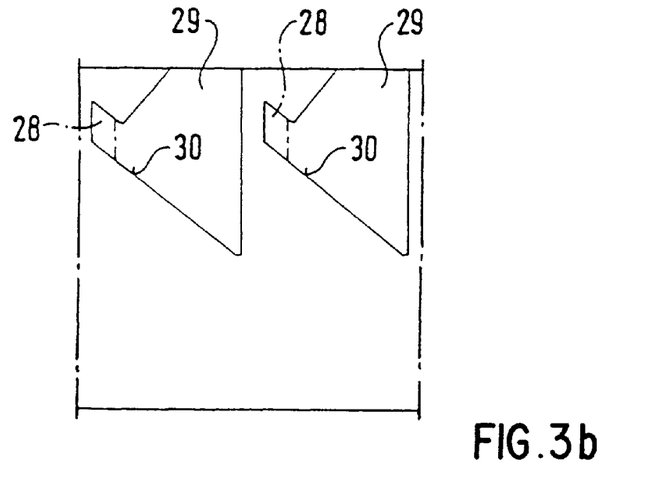

In the embodiment according to FIG. 3b the groove 29 as well as the projection 28 are illustrated. Here too the pressure of a liquid entering from below causes the displacement of the valve body. The projection 28 thereby slides along the slide surface 30 and an unlocking of the valve body takes place.

The valve body as shown in FIG. 3a is provided with one or more vane-like elements 31. The entry of the liquid from below causes the vane-like element to rotate away from the locking position, so that the locking position is not attained again after the valve begins to operate.

Figure 4:
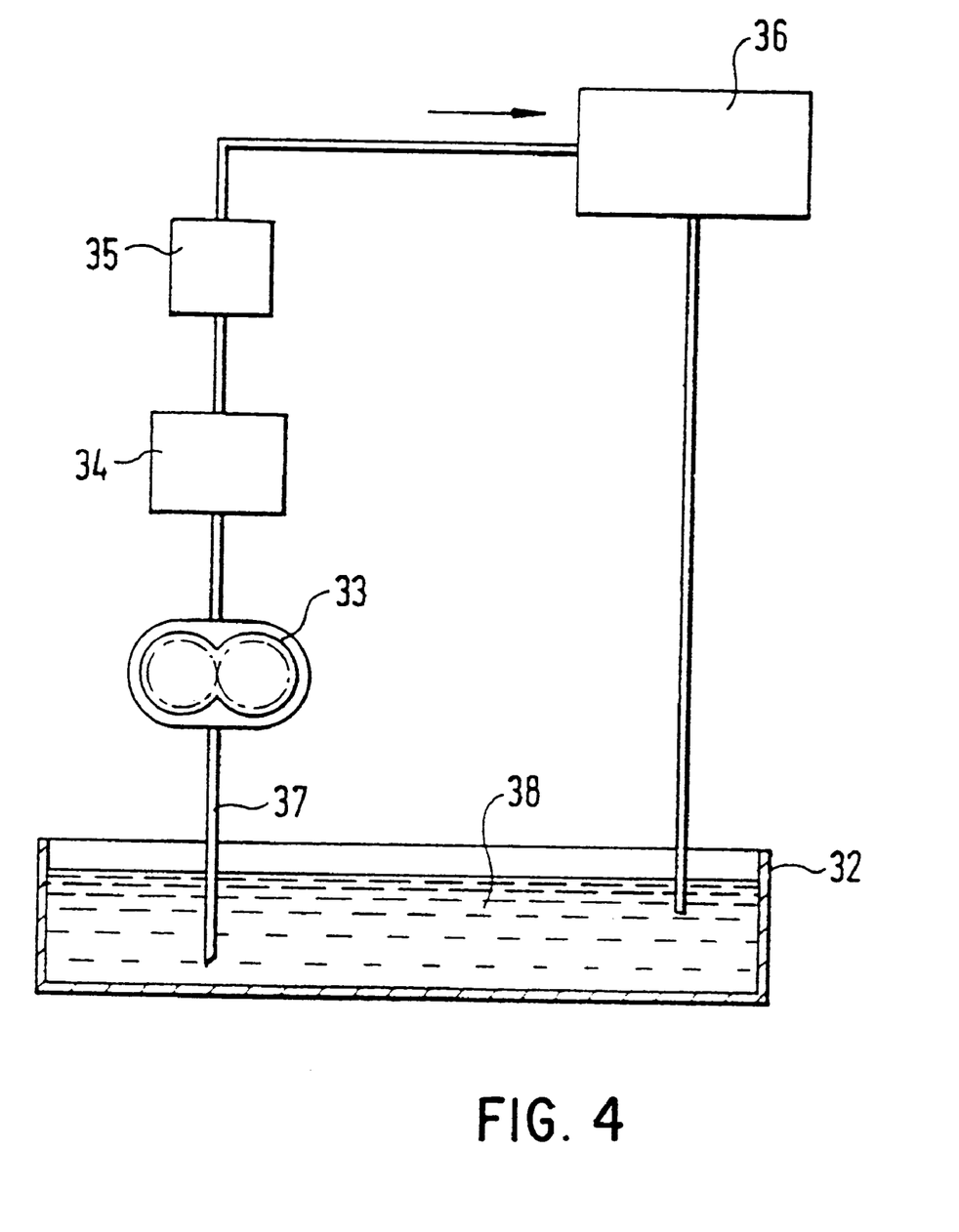
FIG. 4 shows a schematic representation of an oil circuit.

FIG. 4 shows a sketch of an oil circuit in which a valve according to FIGS. 1, 2 or 3 is arranged. Above an oil pan there is a gear pump. This feeds oil through a check valve 34 which has the features described, and a filter 35, to the lubrication points 36. From there the oil returns back to the oil pan.

Upon the first start-up there is still air in the lines 37. The gear pump 33 must first produce a vacuum sufficient to bring the oil in the pan 32 to the gear pump. So that no back pressure will form above the gear pump, or so that the back pressure will be as low as possible, the check valve is in the open position shown in FIGS. 1, 3 or 3.

What is claimed is:

1. A valve for liquids comprising a valve housing, a valve body which is guided in the valve housing, catch means for holding the valve body in an open position, said catch means being releasable by rotation of said valve body, and means for rotating said valve body in response to passage of liquid through the valve, wherein said catch means is released in response to a fluid pressure produced by the liquid passing through the valve and, and the valve thereafter remains in a closed normal operating position.

2. A valve according to claim 1, wherein the catch means comprises a projection formed on one of the valve body and valve housing, said projection being received in a groove formed on the other of said valve body and valve housing.

3. A valve according to claim 2, wherein said projection and said groove form a bayonet catch.

4. A valve according to claim 2, wherein said projection is formed on the valve body, and said groove is formed on the valve housing.

5. A valve according to claim 2, wherein said projection is formed on said valve housing, and said groove is formed on said valve body.

6. A valve according to claim 1, wherein said means for rotating said valve body comprise a spiral slide track in which said projection is received such that axial displacement of said valve body in said valve housing causes said projection to slide along said spiral track and turn said valve body.

7. A valve according to claim 1, further comprising vanes on said valve body which are contacted by liquid flowing through the valve and which in response to pressure of said liquid urge said valve body away from a rotational orientation in which the catch means holds the valve body in said open position.

8. A valve for liquids comprising a valve housing, a valve body which is guided in the valve housing, catch means for holding the valve body in an open position, said catch means being releasable by rotation of said valve body, and means for rotating said valve body in response to passage of liquid through the valve; wherein said valve is disposed in an oil circuit comprising a pump for supplying oil to an internal combustion engine, said valve being initially in the open position upon starting of the engine, and said valve being released from the open position as soon as oil is supplied by said oil pump.

* * * * *